June 21, 1960 T. B. CHACE 2,941,289
METHOD OF MAKING CLAD METAL COOKING UTENSILS
Original Filed April 21, 1954 2 Sheets-Sheet 1
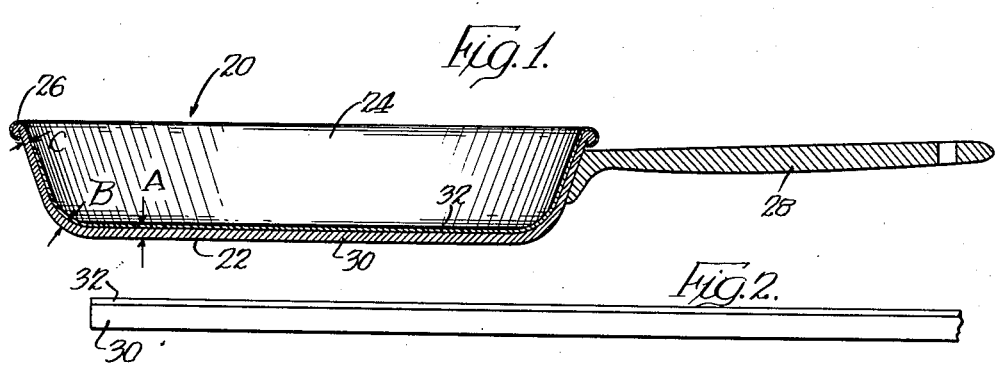
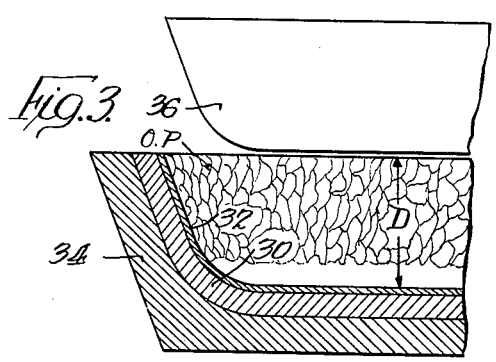
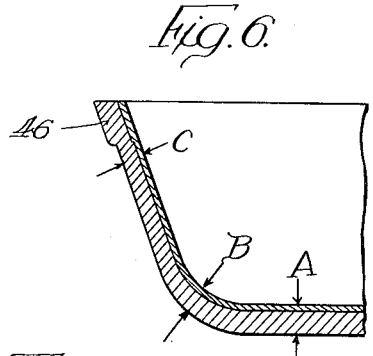
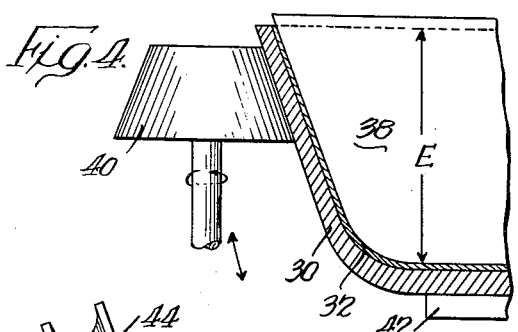
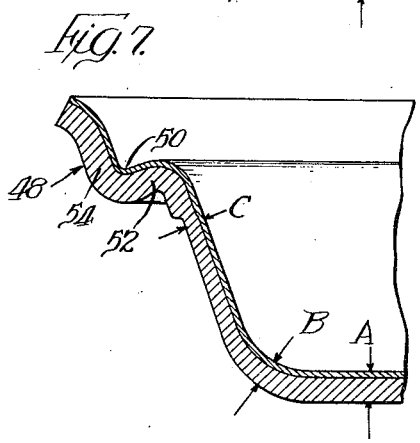
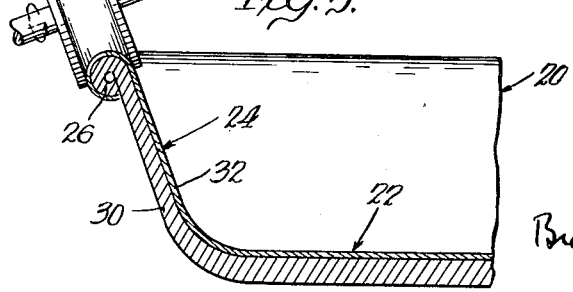
INVENTOR.
Thomas B. Chace
BY
Brown, Jackson, Boettcher
& Dienner
Attys.

June 21, 1960 T. B. CHACE 2,941,289
METHOD OF MAKING CLAD METAL COOKING UTENSILS
Original Filed April 21, 1954 2 Sheets-Sheet 2
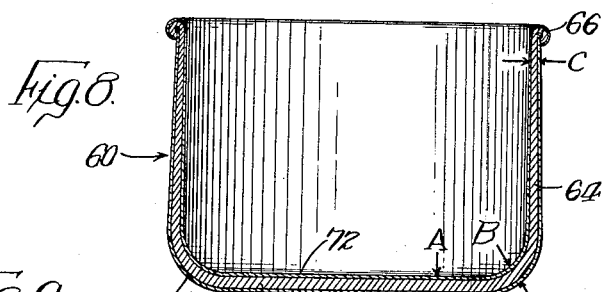
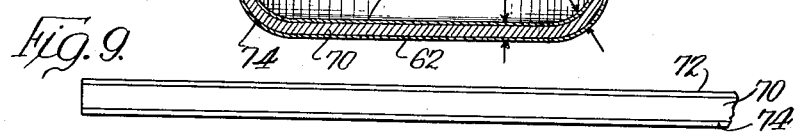
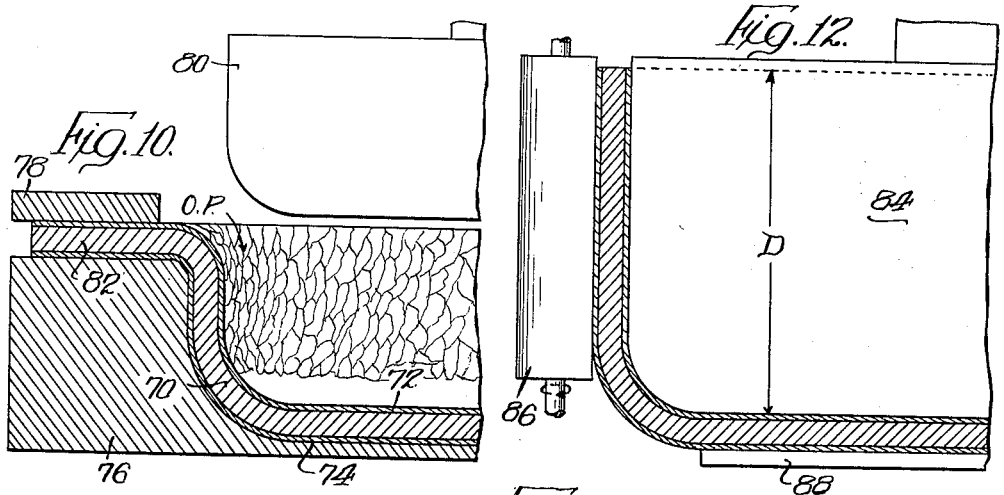
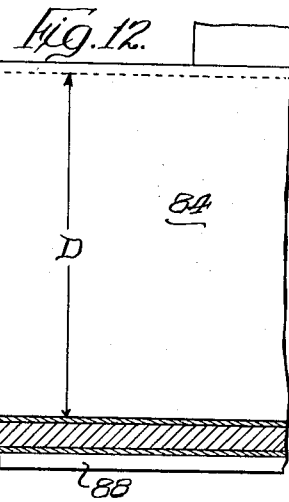
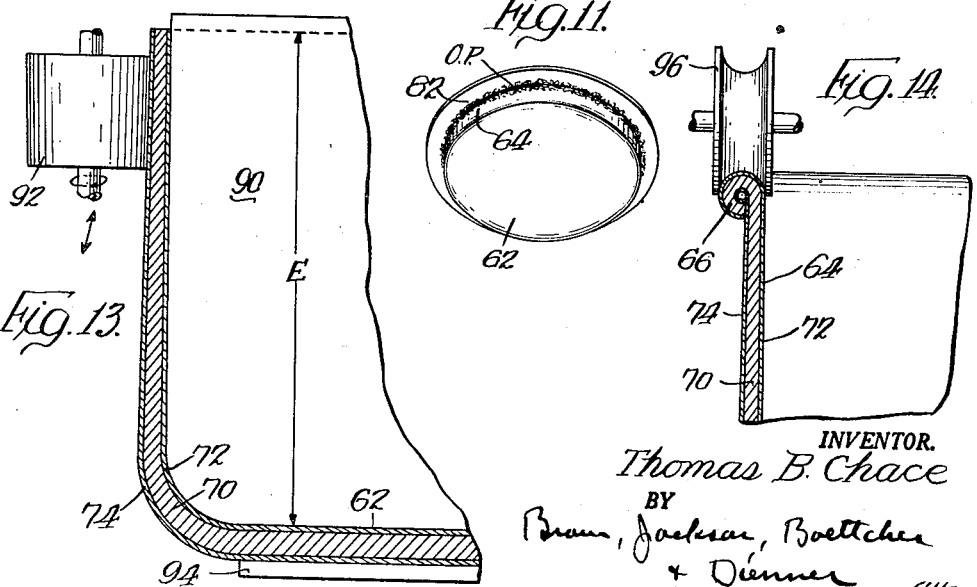
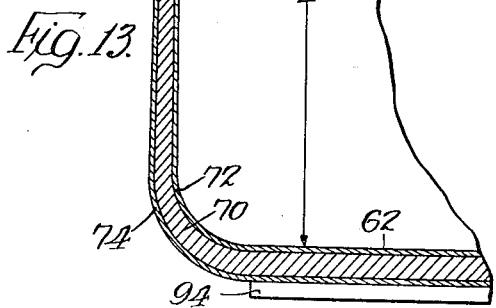
INVENTOR.
Thomas B. Chace
BY
Brown, Jackson, Boettcher
& Dienner
Attys.

United States Patent Office 2,941,289
Patented June 21, 1960

2,941,289
METHOD OF MAKING CLAD METAL COOKING UTENSILS

Thomas B. Chace, 6201 Oakton St., Winnetka, Ill.

Original application Apr. 21, 1954, Ser. No. 424,652, now Patent No. 2,841,137, dated July 1, 1958. Divided and this application Jan. 24, 1958, Ser. No. 711,103

2 Claims. (Cl. 29—544)

The present invention relates to methods of making clad metal cooking utensils, and particularly, to an improved method of making stainless steel clad copper utensils. This application is a division of my co-pending application Ser. No. 424,652, filed April 21, 1954, now Patent No. 2,841,137, issued July 1, 1958.

Copper clad stainless steel cooking utensils have met with wide acceptance in the art because of their attractiveness and practicality. Stainless steel is ideally suited for holding food stuffs because of its non-corroding and non-tainting characteristics and because of the ease of keeping the metal clean. However, stainless steel is a notoriously poor conductor of heat and not suited, per se, for cookware. For this reason, much experimentation has been conducted to coat or otherwise combine a high heat conductivity metal with the stainless steel. One practical method developed for this purpose prior to the present invention comprises the electrodeposition of a layer of copper onto the outer surface of the bottom wall of a stainless steel utensil, the maximum thickness of the two metals in the bottom wall of the completed utensil being approximately equal, whereby such utensils are referred to as copper clad stainless steel. To my knowledge, the only clad metal cooking utensils commercially available prior to the present invention were of this type.

While affording certain advantages, such utensils suffer a severe shortcoming in terms of their cooking capabilities. In compartive cooking tests of such utensils and commercially available cast aluminum utensils, the cooking capabilities of the clad metal utensil fell far short of those of the cast aluminum. The deficiency of the clad metal utensil was particularly characterized by a substantial lack of side wall cooking, whereas the cast aluminum utensil produced a generally uniform cooking effect over the full area of its bottom and side walls. In the commercially available utensils, therefore, cast aluminum produces the best cooking results but suffers the disadvantages that it is heavy and cumbersome, requires a great amount of heat, is corrosive, is capable of tainting foods, and is not readily cleaned. On the other hand, the commercially available copper clad stainless steel utensils, while being non-corrosive, non-tainting, easily cleaned, readily and rapidly heated, and of light weight, do not afford optimum cooking characteristics.

I have previously proposed, in my Patent No. 2,325,659, issued August 3, 1943, a clad metal cooking utensil comprising coextensive layers of stainless steel and copper, the layer of stainless steel being relatively thin and the layer of copper being relatively thick. By virtue of the relative thicknesses of the two metals, the utensil shown in my patent is properly designated a "stainless steel clad copper" utensil. This initial difference affords advantages over "copper clad stainless steel" utensils in terms of better heat conduction, and the provision of copper on the side walls of the utensil results in considerably better cooking capabilities than afforded by the commercially available copper clad stainless steel utensils. However, even this utensil suffered certain disadvantages. First, the appearance of the utensil was marred by the existence of an "orange peel" effect on the side walls thereof. In making the utensil shown in the patent, I used rolled composite sheet stock and employed the steps of annealing the sheet to a suitable temperature for drawing the stainless steel, blanking a circle out of the sheet, and subjecting the annealed blank to a drawing operation to form the utensil. In annealing the stock to accommodate drawing of the stainless steel, the copper is subjected to unavoidable grain growth, and when the draw is effected, the margins of the enlarged copper grains show through the stainless steel just as effectively as if the same were etched in the stainless steel, which appearance has given rise to the term "orange peel." The second disadvantage was that considerably more heat was being transmitted to the side wall of the utensil than was actually desired, therefore resulting in excessive cooking being actively carried out at the sides of the pan, rather than predominantly from the bottom as is desired. Also, the high heat transmission to the side walls resulted in a reduction in heating efficiency, from the standpoint of heat required for the utensil, since some heat was dissipated into open air due to the excellent transmission of heat to the exposed side wall of the utensil.

Thus, it is apparent that prior to my parent application, Serial No. 424,652, no single utensil afforded all of the desirable objectives in the art, namely, optimum cooking capabilities, light weight, convenience of cleaning, attractive appearance, efficiency of heating, and being non-corrosive and non-tainting.

In my said parent application, I have disclosed improved stainless steel clad copper cooking utensils fully satisfying all of the objectives of the art, and affording all of the advantages of conventional clad metal cooking utensils and at the same time affording optimum cooking characteristics. These utensils are characterized in that each comprises a cup-shaped member formed from a composite sheet of stainless steel clad copper stock, said member having smooth interior and exterior surfaces free of "orange peel" and including throughout the full area thereof a relatively thin interior layer of stainless steel and a relatively thick layer of copper outside of and coextensive with the interior layer of stainless steel, the member having a bottom wall of substantially uniform thickness throughout and an upstanding side wall diminishing in thickness at a uniform rate to adjacent the upper edge thereof, the corner joining the bottom and side walls being no thicker than the bottom wall and the lower portion of the side wall being no thicker than the corner, the ratio of thicknesses of the layers of stainless steel and copper being substantially uniform throughout the utensil.

The object of the present invention is to provide an improved method of making said utensils.

More specifically, the object of the invention is the provision of an improved method of making clad metal utensils, which method includes the same steps as set forth above relative to the disclosure of my Patent No. 2,325,659 and includes in addition the step of cold-working the sides or side walls of the utensil after the drawing step. In considering the proposal of my Patent No. 2,325,659, I conceived that cold-working of the portions of the utensil exhibiting the "orange peel" effect would result in reworking the copper to a smaller grain size and that such reduction in grain size might eliminate the "orange peel." This it did. And also, the cold-working produced the unexpected result of elminating the aforesaid disadvantage with respect to overheating of the side walls of the utensils. Specifically, the cold-working results in thinning the side walls, whereby the total amount of heat transmitted to and retained by the side walls is decreased and the ratio of heat retained by the bottom wall to the heat retained by the side walls is increased, thereby to afford a utensil wherein the side walls are uniformly but not excessively heated and cooking is carried out predominantly from the bottom of the utensil. Further, the cold-working affords the third advantage of requiring less stock for the formation of a utensil of a given capacity than would normally be required, since thinning or tapering of the side walls automatically results in extending their height thereby permitting use of a smaller starting blank than would be customary. A fourth advantage is the provision of a better balanced pan, because of the relatively heavy bottom and the relatively thin light side walls, which permits the pan to stand empty and not be overbalanced by the weight of the handle. An additional advantage is that the amount of polishing necessary on the side wall to effect a high luster is minimized.

From the foregoing, it is to be appreciated that the method of the present invention comprises, generally, the steps of annealing a clad metal consisting of at least two metals at a temperature to accommodate drawing of both metals, drawing the clad metal into a generally cup-shape and cold-working the side wall of the cup to reduce the thickness thereof. The cold-working is preferably carried out in successive incremental steps, as by spinning, wherein the side wall of the utensil is subjected to repeated passes of a roller or the like.

In particular, it is an object of the present invention to provide the specific novel step in the formation of clad metal cooking utensils of cold-working the side wall of the utensil simultaneously to cold-work both metals, thus to reduce the thickness of both metals proportionately, whereby the side wall of the utensil is thinned and increased in height to afford the advantages above noted.

Other objects and advantages of the present invention will become apparent in the following detailed description.

Now, in order to acquaint those skilled in the art with the manner of practicing the method of the present invention, I shall describe, in connection with the accompanying drawings, preferred embodiments of the utensil of my parent application and the preferred methods of making the same.

In the drawings:

Figure 1 is a vertical section of a frying pan, comprising an improved clad metal utensil of my parent application;

Figure 2 is a fragmentary side elevation, on an enlarged scale, of the composite stock from which the frying pan is made;

Figure 3 is a fragmentary side view taken on an enlarged scale, partly in section and partly in elevation, showing the manufacturing step of drawing the frying pan to form, the view showing the composite stock as drawn and the lower die piece in section and the upper die piece in elevation;

Figure 4 is a view similar to Figure 3 showing the next step in the method of making the frying pan, namely, the step of cold-working the side wall of the pan;

Figure 5 is a view similar to Figures 3 and 4 showing the manufacturing step of forming a bead on the free upper edge of the side wall of the pan after cold-working of the side wall;

Figure 6 is a fragmentary cross section of a utensil generally similar to that shown in Figure 1 including a different edge configuration produced simply by cold-working all but the upper free edge portion of the side wall of the utensil;

Figure 7 is a view similar to Figure 6 showing a further configuration of the edge of the utensil;

Figure 8 is a view similar to Figure 1 of a sauce pan comprising an improved clad metal utensil of my parent application;

Figure 9 is a view similar to Figure 2 of the composite stock from which the sauce pan is made;

Figure 10 is a view similar to Figure 3 showing the manufacturing step of drawing the utensil to form;

Figure 11 is a perspective view, on a reduced scale, of the utensil following the manufacturing step shown in Figure 10;

Figure 12 is a view similar to Figure 10 showing the succeeding step in the method of making a sauce pan, namely, the step of straightening the side wall of the pan after drawing;

Figure 13 is a view similar to Figure 4 showing the step of cold-working the side wall of the pan; and Figure 14 is a view similar to Figure 5 showing the step of forming a bead on the free upper edge of the side wall of the sauce pan.

Referring now to the drawings and particularly to Figure 1, I have shown a clad metal frying pan comprising a unitary, integral, generally cup-shaped member 20 having a bottom wall 22 and a side wall 24 provided with a rolled upper edge 26. A handle 28 preferably extends generally radially outwardly from the side wall 24. The frying pan or cup-shaped member 20 is preferably formed of the composite stock shown in Figure 2, which comprises a relatively thick layer 30 of high heat conductivity metal, preferably copper, and a relatively thin layer 32 of non-corroding, non-tainting metal, preferably stainless steel. The stainless steel being the thinner of the two, the material is identified as stainless clad copper. The stock is preferably of the character described in my Patent No. 2,325,659 and is preferably formed in the manner generally disclosed in my co-pending application, Serial No. 256,105, now Patent No. 2,757,444. The stock is worked in a manner to be described in conjunction with Figures 3 to 5 to constitute the frying pan shown in Figure 1, wherein the stainless steel is disposed to the interior of the utensil and the copper to the exterior, and wherein the bottom or base wall is relatively thick, as indicated at the arrows A, and the side wall 24 is relatively thin and is tapered, the side wall progressively diminishing in thickness from adjacent the bottom wall, as indicated at the arrows B, to adjacent the upper edge thereof, as indicated at the arrows C.

The thicknesses of the two layers of metal of the composite stock employed in the utensil may be varied. Generally, I have found that the stainless steel layer 32 in the utensil need be only sufficiently thick, first, to act as such restriction to heat transmission that heat applied to the center portion of the copper layer is directed outwardly over the entire area of the pan, second, to present adequate material so that the stainless layer is not polished through to the copper in the manufacture of the pan and, third, to present adequate material in the finished product to insure long and useful service. Dimensionally, the steel could be as thin as .002", but I recommend that a predetermined ratio of steel to copper, as hereinafter defined, be maintained. The copper layer on the other hand must be thick enough to have the capacity to carry heat readily and rapidly from the point of heat contact so as to spread the heat uniformly over the pan. Dimensionally, I have found that a minimum of about .020" thickness of copper in the bottom of the utensil is necessary to perform satisfactorily the function of heat transmission. In view of these approximate minimum dimensions, it would be possible to employ a composite stock .022" thick in the manufacture of a satisfactory utensil, the thickness of the steel in this case being 10% of the thickness of the copper layer. However, conventional cookware is generally formed from stock that ranges from about .025" to about .060" in thickness, and within this commercial range I prefer to employ a steel to copper ratio of about 1:4, which of course insures at least the minimum copper thickness and a satisfactory steel thickness. Thus, the preferred relation is a steel layer about 25% as thick as the copper layer, and a copper layer having a minimum thickness in the bottom wall of the utensil of about .020".

The principal thickness dimensions of the finished utensil of the present invention are also variable according to the type or style, size and capacity of the utensil. Generally, in view of the foregoing, the dimension at A should not be less than about .025", .020" copper and .005" stainless, since the bottom of the utensil is subject to the greatest abuse and wear, and since the heat transmission capability of the copper must be fully exhibited in the bottom. In the formation of the pan or utensil, the side wall is extended upwardly and preferably outwardly from the bottom wall so that the included angle between the bottom and side walls is at least 90 degrees. The corner between the bottom and side walls is no thicker than the bottom wall, and the side wall is tapered from the corner to adjacent its upper edge. The thickness of the side adjacent the bottom, as at B, is substantially the same as, or slightly less than, that of the bottom at A, and tapers or diminishes in thickness uniformly upward so that the wall adjacent the upper free edge thereof is substantially thinner than the dimension at B. The limitation on the thinning of the side wall is suitably such as to afford a dimension at C of about 65% of, or about one-third less than the thickness of the bottom wall at A. Since the side wall need not resist the wear and need not carry the amount of heat that the bottom wall must, reduction of the thickness of the side wall is not only permissible, but affords very substantial advantages, as will presently appear. Irrespective of the dimensional variations at various portions of the pan, the ratio of thicknesses of the steel and copper layers is maintained constant over the entire area of the pan.

Bearing the foregoing in mind, a preferred embodiment of the frying pan of Figure 1 is comprised of a two ply stainless clad copper as shown, wherein the layer of stainless is approximately 25% as thick as the copper layer. In a 10" diameter frying pan, a suitable and preferred thickness of the stock is .045", in which case the stainless steel is .009" thick and the copper is .036" thick. When the cooking utensil or frying pan is completed in accordance with the method of the present invention, the bottom of the pan is of substantially the same thickness as the starting material, so that in a 10" diameter frying pan, the dimension at A would preferably be .045". In this embodiment, the dimension at B is approximately .045", or slightly less. The thickness of the side wall adjacent the upper free edge thereof, at C, is one-third less than the thickness of the bottom wall, or .030" in the preferred 10" pan. As above noted, the ratio of thicknesses of the steel and copper layers is maintained constant over the entire area of the pan. In other words, the preferred ratio of steel to copper is 1 to 4, so that in the preferred 10" pan having a dimension at A of .045" and a dimension at C of .030" the thickness of the steel at A is .009" and at C is .006", the thickness of the copper being .036" at A and .006", at C. In smaller size pans, the general dimensional and thickness relationships above stated are adhered to, but the starting thickness of the stock is preferably less. Specifically, in an 8" diameter frying pan, I prefer the following dimensions; at A .035", at B approximately .035", at C .025"; and in a 6" diameter pan, I prefer the dimensions; at A .030", at B approximately .030", at C .020".

Having thus described the structural aspects of the utensil, reference is now made to Figures 2 to 5 for description of the preferred method provided according to the present invention for making the said utensil, i.e., a frying pan. The general form of a frying pan and other cooking utensils is circular and the present invention will be described with reference to such customary form. However, square and polygonal utensils, particularly frying pans, are commencing to be the vogue and it will be appreciated that the invention, with minor variations, is applicable to such forms as well.

The starting blank of material, as shown in elevation in Figure 2, preferably comprises a circular blank cut from a sheet of composite stock, the blank being of the diameter required for the formation of the finished product. According to the usual formation of stamped utensils, the blank for a 10" frying pan would be approximately 13" in diameter. However, according to the present invention, as will appear more fully hereinafter, the blank for a 10" pan of identical volume and size need be only 11½" in diameter, thus affording a substantial saving in material. The stock as above noted preferably comprises the relatively thick layer of copper 30 and the relatively thin layer of stainless steel 32, the steel preferably being a chromium ferrite alloy having 16% to 18% chromium with a low carbon content. To accommodate drawing of the blank, in the manner shown in Figure 3 for example, it is necessary that the blank be annealed at a temperature at which the steel is rendered sufficiently ductile for the draw. Since the copper generally has lower annealing temperatures than the steel, the same is automatically rendered drawable at the necessary annealing temperature of the steel. By employing a straight chromium ferrite steel, the annealing temperature may suitably be in the vicinity of 1400° F. to 1450° F. instead of the much higher temperature required with chromium nickel steels. This relatively low annealing temperature is good for copper and does not favor excessive grain growth. However, there is bound to be some grain growth in the copper at these elevated temperatures.

When the composite stock has been annealed, the blank is placed in a two-piece die comprising, for example, as shown in Figure 3, a stationary die piece 34 having a generally cup-shaped cavity therein, and a movable head 36 generally complementary to the cavity, but having a clearance with respect to the cavity to accommodate the composite stock 30—32. The composite stock is placed in the die with the copper layer 30 facing the die cavity and the stainless steel layer facing the head 36. When subjected to the relative movements of the die pieces 34 and 36 in the conventional manner, the circular blank is drawn into the generally cup-shaped form shown in Figure 3. The bottom wall of the cup-shaped member thus defined is of the diameter of the finished product, as is customary in stamped cooking utensils, but the side wall is of considerably less height than conventional due to the smaller than customary diameter of the starting blank. The shortening of the side wall of the utensil, resulting from the relatively small diameter of the starting blank, affords further economies in that the die pieces need not be as thick or deep as those usually required. When removed from the cavity of the die piece 34, the blank is of a generally shallow cup-shape having a stainless steel interior and a copper exterior and having side and bottom walls of uniform thickness, equal substantially to the thickness of the starting blank.

In the cup-shaped form resulting from the drawing step of Figure 3, the interior surface of the side wall exhibits a strange appearance, which has been simulated to a certain extent, as indicated at O.P. in Figure 3. To the eye, the stainless steel at the side wall appears to have irregular lines therein defining a granular pattern. Yet, no amount of polishing of the steel will remove the appearance of these marks or lines, which appearance has come to be called an "orange peel" effect in the art. While the orange peel does not disadvantageously affect the use of the pan, the appearance is a tremendous sales disadvantage from the esthetic standpoint. In considering how to eliminate the orange peel, thus to render the pan esthetically desirable, I reasoned that the appearance resulted from enlargement of the grain in the copper. In other words, during annealing of the composite stock at the temperature necessary to accommodate drawing of the stainless steel, the copper is subjected to some grain growth so that the copper grain is relatively large, even though not excessively large with the preferred materials and annealing temperatures. Upon drawing particularly, due to the strain to which the metal is subjected, the enlarged copper grains show through the stainless steel, as though the stainless steel were a magic metallurgical mirror. I then further reasoned that the orange peel effect could possibly be eliminated by reworking the copper to reduce its grain size. Such working would have to be effected cold to prevent reoccurrence of the enlarged grains in the copper. Accordingly, I set out to cold-work the copper and discovered that cold-working produces certain unexpected results.

While cold-working of the drawn blank resulting from the manufacturing step shown in Figure 3 can be carried out in many manners, I have found the well known art of "spinning" to be a particularly effective method. In Figure 4, I have shown the step of spinning the side wall of the drawn blank by mounting the blank on a rotatable collet or chuck, indicated generally at 38, and subjecting the side wall of the cup-shaped member to a pressing action through the medium of one or more positively rotated rollers 40. Since only the side wall of the utensil exhibits the orange peel effect, I cold-work only the side wall. Thus, the drawn blank can suitably be held to the collet 38 by a base plate 42. Substantially the entire side wall of the drawn blank is worked and for this purpose the roller 40 may be of a length equal to the finish dimension of the side wall, or the collet and roller may be relatively movable longitudinally of the axis of rotation of the collet. In cold-working the side wall of the drawn blank, I preferably move the roller generally upwardly and inwardly with respect to the collet 38 in successive incremental steps and in so doing effectively rework the copper into a small grain size, whereupon as I had reasoned, the orange peel disappeared. At the same time, however, I discovered that I was simultaneously working both the copper and the stainless steel and thinning both proportionately, whereupon the side wall of the utensil was heightened, as is clearly exhibited by a comparison of the dimension D in Figure 3 and the corresponding dimension E in Figure 4.

After initial cold-working, testing of the utensil with the thinned side wall exhibited as an unexpected result of the cold-working, very substantial advantages with reference to optimum cooking characteristics. Thus, cold-working eliminates the orange peel and effects thinning of the side wall of the utensil, which latter factor leads to the very substantial advantage of affording optimum cooking characteristics in the completed utensil. Second, the heightening of the side wall accommodates a starting blank of substantially smaller diameter than would normally be required, thus to effect economies in the use of materials. Third, the thinning of the side walls, in comparison to conventional utensils, results in the provision of a relatively heavy bottom in the utensil which affords a high degree of balance and prevents the utensil from being overbalanced when the handle 28 is affixed thereto. Fourth, the cold-working of the side walls acts to polish both the interior and exterior surfaces of the same to a very substantial extent, so that only a minimum of finish polishing is required to produce a high surface lustre. In other words, then, a single manufacturing step intended for a single purpose accomplishes, according to the present invention, five results, namely, the intended result and the four above stated unexpected results. This single step of cold-working the side wall of the utensil, as amplified to afford the preferred dimensional relationships hereinbefore set forth, thus provides the optimum in cooking utensils. Preferably, as is shown in Figure 4, the cold-working roller 40 is tapered to conform to and produce the desired taper of the side wall of the utensil in its completed form.

After cold-working, the pan proper may be completed as by rolling the bead or rim 26 on the upper free edge of the side wall of the pan. The bead or rim 26 may suitably be formed by subjecting the free edge of the pan to a peripherally, arcuately recessed roller 44, as shown in Figure 5, the roller being applied to the free edge of the pan in the plane of or at the same inclination as the side wall of the pan and being positively rotated and being moved about the periphery of the pan suitably by rotating the pan. The roller preferably is effective to roll the bead completely around to have the free edge of the utensil engage the outer surface of the side wall thereof, as is shown in Figure 5. Completely closing the bead or rim affords the advantages that no sharp edges can possibly be exposed, that no food or other matter can enter the interior of the bead to become contaminated or present an unsanitary condition, and that the bead thus presents to the exterior of the pan a silvery ring bounding the copper to enhance the appearance of the utensil.

A suitable modification of the configuration of the lip or free edge portion of the utensil is shown in Figure 6, wherein the lip portion at 46 is comprised of metal of substantially the same thickness as the starting blank. In cold-working the side wall of the utensil, if cold-working is carried out fully to the upper edge, the stock at the upper edge will be thin and sharp and must be turned or rolled, as in Figure 5, to prevent injury to users of the utensil. However, if the side wall is cold-worked in the manner hereinbefore described only to adjacent the free edge thereof, from B to C, the original thickness of the stock is maintained at the upper edge, at 46, which thickness is adequate to prevent exposure of sharp dangerous edges. Equally as important is the fact that adequate material is provided to rigidify the side wall of the utensil to prevent bending and deformation. In Figure 5, the bead 26 accomplishes this purpose, and in Figure 6 it is the thick rim 46 that rigidifies the pan. To finish the utensil, so as to eliminate all orange peel, a relatively slight cold-working of the lip or rim portion 46 is preferred.

In use, the relatively thick rim or lip 46 will not affect the optimum cooking characteristics of the utensil, since the utensil would not be filled above the point C, and thus the rim portion 46 would not be engaged by the contents of the utensil. Dimensionally, the lip 46 could suitably be 1/8" to 1/4" in height, and slightly thinner than the thickness of the stock at A.

In Figure 7, a utensil, having a side wall cold-worked somewhat in the manner of the Figure 6 modification, is shown as including a further modification of the lip or rim portion. In manufacture of the utensil of Figure 7, the side wall is cold-worked to taper the same only from B to C, to afford a minimum thickness at C. The rim portion, indicated generally at 48, may be cold-worked slightly, but the thickness thereof is maintained substantially the same as that at A, for the reasons noted in respect to Figure 6. At any suitable step in the formation of the utensil, such as the drawing step, the rim portion 48 is formed to a configuration defining a V-groove 50, which groove is adapted to receive the cover of the cooker to provide a seat against which the cover may seal. Such V-grooved seat is of particular value in waterless cookers and the like. In the form shown, the V-groove is defined by deforming the upper portion of the side wall outwardly and downwardly, as at 52, and then upwardly and outwardly, as at 54. Formation of the lip in this manner, and minimizing of the cold-working of the rim to maintain substantially the starting stock thickness, serves to eliminate sharp edges, to rigidify the utensil, and to afford a firm, accurate seat for the utensil cover.

Other configurations of the lip or rim portion and of the side wall portion of the utensil, and of the general outline or shape of the utensil as well, may of course be employed within the scope of the present invention.

To complete the utensil, irrespective of the lip configuration, the handle 28, or like handle means, is secured to the side wall of the utensil below the lip or rim in any customary manner.

As will be appreciated by those skilled in the art, the method as above described with respect to two ply stock may as well be practiced on other composite stocks, such as the three ply stock to be described. Also, while reference has been made specifically to stainless steel clad copper stock, it will be appreciated that the problems with other non-corroding, non-tainting, low heat transfer metals, clad with other high heat conductivity metals are substantially the same as above described, and subject to solution in the manner afforded according to the present invention.

Referring now to Figures 8 to 14, I have shown a second type of utensil, namely a sauce pan, and the essential steps of the method of manufacturing the same according to the present invention. While Figures 8 to 14 relate to the manufacture of utensils from a three ply stock, it is to be appreciated that the sauce pan of Figure 8 may be formed of two ply stock as shown in Figure 2, and conversely, that the frying pans of Figures 1, 6 and 7 may be formed of the three ply stock shown in Figure 9.

The clad metal sauce pan shown in Figure 8 conforms generally to the frying pan shown in Figure 1, and is manufactured in conformity with the limitations or specifications set forth hereinbefore. The pan comprises a unitary, integral, generally cup-shaped member 60 having a relatively thick bottom wall 62 and a relatively thin, tapered side wall 64. The side wall at its upper free edge is provided with a completely closed, rolled bead or rim 66 affording the advantages above noted with respect to the rim 26 of the frying pan. If desired, the rim and side wall configurations of Figures 6 and 7 may be employed in sauce pans instead of the bead 66. The sauce pan, the same as the frying pan, may be provided in any suitable manner with such handle means (not shown) as may be desired or conventional in the art for various capacities of sauce pans. Two ply stock, such as that shown in Figure 2, comprising a relatively thick outer layer of high heat conductivity metal, preferably copper, and a relatively thin inner layer of non-corroding, non-tainting metal, preferably stainless steel, is the preferred composite stock employed in manufacturing clad metal utensils, both frying pans and sauce pans, for domestic use.

For commercial and institutional kitchens, however, stainless steel utensils, i.e., those having stainless steel exteriors as well as interiors, are preferred because of the ease of keeping the utensils clean and sanitary, and of having the utensils clearly exhibit such sanitary condition. A three ply clad metal previously developed, comprising relatively thin outer layers of stainless steel and a relatively thick intermediate layer of copper, is ideal for institutional cooking utensils. Such a composite stock is disclosed in my said Patent No. 2,757,444. This three ply composite stock is provided commercially in a variety of ratios of relative thickness of the metal layers, two well known forms of which comprise 40% copper and 60% copper, respectively. For purposes of the invention, the 60% copper three ply stock is more acceptable than the 40%, (although the latter may satisfactorily be employed) since the layers of steel each have a thickness of 20% of the stock and thus have a steel to copper ratio of 1 to 3, which quite closely approximates the metal to metal ratio limitation hereinbefore described.

In the formation of the cooking utensils from three ply, clad metal stock of the character described, the same general dimensional relationships as above stated are preferably adhered to, although the stock employed as a starting material may suitably be somewhat thicker than the preferred two ply stock, thus to afford greater resistance to the abuse to which utensils are subjected in commercial kitchens, and to insure an adequate thickness of copper for the transmission of heat. Heat applied to the stainless outer layer of the pan is transmitted directly through this layer to the copper layer, which rapidly distributes the heat throughout the full area of the utensil and stores the heat for transmission through the relatively thin interior layer of steel uniformly and efficiently to heat the contents of the utensil.

In view of the desirability of three ply clad metal stock for certain utensils, I have shown the sauce pan in Figure 8 as formed of such stock. A preferred stock is shown in Figure 9 as comprising a relatively thick intermediate layer 70 of high heat conductivity metal, preferably copper, and relatively thin outer layers 72 and 74, respectively of non-corroding, non-tainting metal, preferably stainless steel. As in the previous description of the two ply stock, the copper layer in the bottom of the utensil and thus of the starting stock, has a minimum thickness of about .020". The percentage thickness of each layer of steel to the thickness of the copper layer again is preferably about 25%. In commercially accepted stock thicknesses of .025" to .060", the ratio of each layer of steel to the layer of copper at the lower stock thickness would have to be about 1 to 8, but in thicknesses from about .030" on up, the preferred ratio of 1:4 can be adhered to. Despite the use of three ply stock as opposed to two ply stock, the relative dimensional specifications of the sauce pan are the same as those of the frying pan, namely, the thickness of the thinnest portion of the side wall 64 being about one-third less than the thickness of the bottom wall. Specifically, the thickest dimension of the pan is in the uniform bottom wall 62 thereof, as indicated at the arrows A, and the side wall 64 is tapered, having a dimension adjacent the bottom wall, as indicated at the arrows B, approximately the same as, or slightly less than, the dimension at A, and having a dimension adjacent the upper free edge thereof, as indicated at the arrows C, of substantially less than the dimension at A, namely, about 65% of the thickness at A. In addition sauce pans in decreasing capacities may suitably employ progressively thinner composite stock, as was the case with the clad metal frying pan previously described. For example, a one-pint sauce pan could be equated generally to a 6" frying pan, a one-quart sauce pan to an 8" frying pan, and a two-quart sauce pan to a 10" frying pan. In all variations, the ratio of steel to copper is preferably maintained constant throughout the full area of the pan.

Having thus described the structure of the sauce pan and the structural aspects of three ply clad metal utensils, reference is now made to Figures 9 to 14, as compared to Figures 2 to 5, for a description of the preferred method providing according to the present invention for making a clad metal sauce pan.

The starting blank of material used in the formation of the sauce pan of Figure 8 is shown in Figure 9 and preferably comprises a circular blank of clad metal, reference being had to the above and to the detailed description of Figure 2 for a full disclosure of the materials and structure of the blank. As with frying pans, the blank, as provided according to the present invention, is of a much smaller diameter than would be customary for a given capacity pan, thus affording substantial savings in respect to the amount of material required. This blank, or the sheet of metal prior to blanking, is annealed, at the recommended temperature of 1400° F. to 1450° F. preferably, to accommodate drawing of the chromium ferrite stainless steel.

The drawing step of the method employed in the manufacture of sauce pans differs from that employed for frying pans, due to the relatively deeper draw required. Specifically, as shown in Figure 10, the lower die piece 76 includes a radial flange portion with which a clamping ring 78 cooperates to hold the peripheral portions of the blank during the actual drawing procedure. As the die pieces 76 and 80 are operated in the customary manner, the central portion of the blank is drawn downwardly to define a cup-shaped central portion in the blank, the diameter of the base wall of the cup comprising the finished diameter of the pan. Upon removal of the drawn blank from the cavity of the die piece 76, the blank includes a radial flange 82, and as shown in Figures 10 and 11, the side wall portion 64 and the flange 82 adjacent and at the bend or corner therebetween exhibit the orange peel effect, indicated at O.P., complained of hereinbefore. Since three ply stock is employed, the orange peel is exhibited not only on the interior surface of the utensil, but in the exterior surface as well, in other words, in both layers of steel. The manner in which this orange peel is eliminated is described hereinafter.

To complete the basic cup-shaped form of the blanked and drawn metal, it is necessary that the radial flange 82 be turned upwardly to define a continuous side wall for the pan. The bending or straightening of the flange 82 into alignment with the side of the cup formed by the draw is a manufacturing step not normally encountered in manufacturing frying pans. A suitable manner of effecting this step is shown in Figure 12, wherein an elongate collet or chuck 84 is fitted into the cup formed by the draw. The radial flange 82 is then worked upon suitably by a rotating roller 86 or the like, to bend the flange into engagement with the cylindrical surface of the collet 84, as is shown in the figure, thus to define a true cup-shape. Since only the side of the utensil is worked upon, the drawn blank may be held to the collet by a base plate 88 or the like.

After the blank of Figure 9 has been annealed, drawn as shown in Figure 10, and straightened at the side wall thereof as shown in Figure 12, the side wall 64, particularly at the center portion thereof, exhibits the orange peel effect, O.P. To eliminate this unattractive and objectionable effect, the side wall 64 of the sauce pan is cold-worked as shown in Figure 13, whereupon the side wall is simultaneously thinned and heightened, as will be appreciated from a comparison of dimensions D and E in Figures 12 and 13, respectively. The cold-working is preferably carried out in the same manner as described hereinbefore in conjunction with Figure 4 by manipulation of the collet 90, the roller 92 and the base plate 94, as shown in Figure 13. Preferably, the roller 92 is tapered to conform to and produce the ultimate taper desired in the side wall 64 of the utensil, and the same is preferably moved in successive, incremental, inward passes. Such cold-working, as will be appreciated from the preceding description, produces the results of eliminating orange peel on both the interior and exterior surfaces, i.e., in both steel layers, simply by reducing the copper grain size, elongating the side wall whereby less starting material is required than would be customary, and thinning the side wall to impart optimum cooking characteristics to the utensil, to impart a high degree of balance and to polish the side wall of the utensil.

After cold-working, the sauce pan may be completed by rolling a completely closed bead or rim 66 on the upper free edge of the side wall of the pan by means of a roller 96, as shown in Figure 14. Generally, the roller 96 is operated and performs in much the same manner as the roller 44 described in conjunction with Figure 5. As alternatives, lip or rim portions like those shown in Figures 6 and 7 may be provided.

From the foregoing, it is to be appreciated that the present invention affords an improved method of making clad metal cooking utensils characterized by the step of cold-working the side wall of the utensil, which single step affords the advantages of eliminating orange peel, elongating the side wall of the utensil to insure economical use of materials, and thinning of the side wall to impart optimum cooking characteristics to the utensil, to afford a well balanced utensil, and to minimize finish polishing of the utensil. The method of the invention particularly facilitates production of the highly improved clad metal cooking utensils described and claimed in my application Serial No. 424,652, which utensils in turn afford the advantages of economical use of material, lightweight, minimum heat requirement, minimum amount of care, ready cleaning, non-corrosiveness, non-tainting of foodstuffs, and optimum cooking characteristics.

While I have illustrated and described what I regard to be preferred embodiments of the method of the present invention, it is to be appreciated that various changes and modifications may be made therein without departing from the scope of the invention, as defined by the appended claims.

I claim:

1. A process of making a clad metal cooking utensil from a clad metal blank including a layer of copper and a relatively thin layer of stainless steel bonded to the layer of copper, comprising the steps of annealing the blank at a temperature to accommodate drawing of the stainless steel, drawing the annealed blank into a generally shallow cup-shape with stainless steel disposed to the interior of the cup whereupon the stainless steel is marred by appearance on the side wall portion thereof of an undesirable orange peel effect, and cold-working the side wall of the cup simultaneously to cold-work both metals, eliminate the orange peel effect occurring upon drawing of the blank, reduce the thicknesses of both metals in proportion to their original thicknesses and increase the height of both metals by the same amount, thereby to define a relatively high unmarred side wall that is thinner than the base wall of the cup.

2. A process of making a clad metal cooking utensil from a blank of clad metal of uniform thickness including a relatively thick layer of copper of uniform thickness and a relatively thin layer of stainless steel of uniform thickness bonded to the layer of copper, comprising the steps of annealing the blank at a temperature to accommodate drawing of the stainless steel, drawing the annealed blank into a generally shallow cup-shape with stainless steel disposed to the interior of the cup whereupon the stainless steel is marred by appearance on the side wall portion thereof of an undesirable orange peel effect, cold-working the side wall of the cup to a progressively increasing degree from adjacent the base wall of the cup to adjacent the free edge of the side wall simultaneously to cold-work both the copper and the stainless steel, to remove from the side wall portion of the stainless steel the orange peel effect that appears thereon upon drawing of the blank to cup-shape, to reduce the thicknesses of both the copper and the stainless steel in proportion to the relative original thicknesses of the two metals progressively from adjacent the base wall of the cup to adjacent the free edge of the side wall, thus to define a tapered side wall of reducing thickness from adjacent the bottom to adjacent the top thereof wherein the copper is relatively thick and the stainless steel relatively thin, and to increase the height of both the copper and the stainless steel by the same amount thus to increase the height of the side wall of the cup.

References Cited in the file of this patent

UNITED STATES PATENTS

| | | |
|---|---|---|
| 1,728,033 | Blake et al. | Sept. 10, 1929 |
| 2,028,996 | Sautier | Jan. 28, 1936 |
| 2,301,565 | Moore | Nov. 10, 1942 |
| 2,325,659 | Chace | Aug. 3, 1943 |
| 2,471,663 | Tietz | May 31, 1949 |
| 2,522,257 | Curtis | Sept. 12, 1950 |
| 2,653,117 | Keene | Sept. 22, 1953 |

FOREIGN PATENTS

| | | |
|---|---|---|
| 609,907 | Great Britain | Oct. 8, 1948 |
| 466,918 | Canada | Aug. 1, 1950 |